(12) United States Patent
Yamanaka

(10) Patent No.: US 7,153,714 B2
(45) Date of Patent: Dec. 26, 2006

(54) METHOD OF MANUFACTURING FLAT PANEL DISPLAYS

(75) Inventor: Hiroshi Yamanaka, Kawasaki (JP)

(73) Assignee: Fujitsu Hitachi Plasma Display Limited, Kawasaki (JP)

( * ) Notice: Subject to any disclaimer, the term of this patent is extended or adjusted under 35 U.S.C. 154(b) by 0 days.

(21) Appl. No.: 10/838,337

(22) Filed: May 5, 2004

(65) Prior Publication Data

US 2005/0032262 A1 Feb. 10, 2005

(30) Foreign Application Priority Data

Aug. 8, 2003 (JP) ............................. 2003-289800

(51) Int. Cl.
*H01L 21/033* (2006.01)
*H01L 21/00* (2006.01)

(52) U.S. Cl. ........................... 438/30; 438/27; 438/22
(58) Field of Classification Search ................ 438/22, 438/27, 29, 30
See application file for complete search history.

(56) References Cited

U.S. PATENT DOCUMENTS

| | | | |
|---|---|---|---|
| 6,261,856 B1 * | 7/2001 | Shinohara et al. | 438/30 |
| 6,439,943 B1 * | 8/2002 | Aoki et al. | 445/24 |
| 6,681,355 B1 | 1/2004 | Gion et al. | |
| 6,746,102 B1 * | 6/2004 | Shinkoda et al. | 347/40 |
| 6,794,220 B1 * | 9/2004 | Hirai et al. | 438/99 |
| 2005/0112906 A1 * | 5/2005 | Maekawa et al. | 438/795 |

FOREIGN PATENT DOCUMENTS

| | | | |
|---|---|---|---|
| JP | 08-286028 | * | 1/1996 |
| JP | 2000-292489 | | 10/2000 |

\* cited by examiner

*Primary Examiner*—Zandra V. Smith
*Assistant Examiner*—Pamela E Perkins
(74) *Attorney, Agent, or Firm*—Staas & Halsey LLP

(57) ABSTRACT

To enable formation of a pattern of constituent elements, arranged in correspondence with an arrangement of cells in a display region, as desired or required with a minimized quantity of the film material, a method of manufacturing a flat panel display is provided, which includes depositing a film material for forming the constituent elements on a substrate so as to form films of a pattern encompassing the pattern of the constituent elements, and irradiating the films, made of the film material, with a laser beam so as to shape the pattern of the films to a shape corresponding to the pattern of the constituent elements.

2 Claims, 2 Drawing Sheets

METHOD OF MANUFACTURING FLAT PANEL DISPLAYS

BACKGROUND OF THE INVENTION

1. Field of the Invention

The present invention relates to a method of manufacturing a flat panel display of a type having a pattern of constituent elements arranged in correspondence with an arrangement of cells in a display region.

2. Description of the Prior Art

In the course of mass production of flat panel displays (FPDs) such as, for example, plasma display panels, liquid crystal display panels and organic electroluminescence display panels, attempts have hitherto been made to minimize indirect materials of a kind utilized solely for the convenience of manufacture thereof. The indirect materials are, when intended products are completed, in most cases disposed of as wastes and, therefore, the need has been well recognized to minimize the indirect materials not only to avoid concomitant increase of the manufacturing cost, but also to avoid environmental contamination.

In general, photolithography has hitherto been used to form electrodes employed in the flat panel displays. Specifically, in the manufacture of the conventional flat panel displays, using thin-film technology such as, for example, a vacuum deposition technique or a chemical vapor deposition (CVD) technique is used to form an electroconductive film on a substrate so as to cover the entire surface area of the substrate, followed by the pattern exposure subjected to a photoresist to form an etching mask. Thereafter, unnecessary portions of the electroconductive film on the substrate are chemically or physically etched off to thereby complete formation of the electrodes. The practice of such a photolithography requires a substantial amount of indirect materials such as, for example, photoresist and developing material and renders it difficult to secure the pattern accuracy as the screen size of the flat panel display increases.

The Japanese Laid-open Patent Publication No. 2000-292489, published in 2000, discloses a method of making electrodes used in a plasma display panel (PDP), in which the electroconductive film is patterned by the use of a laser beam machining. In the practice of such laser beam machining, a light shielding mask of a size sufficiently smaller than the screen size is used so that portions of the electroconductive film can be irradiated in a pattern with a laser beam to remove those unnecessary portions of the electroconductive film. The electroconductive film in its entirety is then patterned while the substrate bearing the electroconductive film is moved relative to a laser irradiating system including the light shielding mask. As is well known to those skilled n the art, the patterning performed by the use of the laser irradiation along with the use of the light shielding mask is considered having a higher workability than that achieved by the patterning based on the delineating scheme utilizing a spot irradiation. Also, since the light shielding mask used in such laser patterning is small, a desired pattern accuracy can be secured regardless of the screen size.

In the manufacture of the conventional FPDs, however, although the use of the laser beam machining to form the electrodes is effective to reduce the amount of the indirect materials used as compared with that in the practice of the photolithography, a problem has hitherto been recognized in which residual dross responsible for surface defects tends to accumulate considerably. Also, another problem is also recognized in which defects in patterning such as edge swelling of the patterned electrodes resulting from influence brought about by heat evolved during the laser beam irradiation tend to be formed easily.

SUMMARY OF THE INVENTION

Accordingly, the present invention has for its primary object to enable formation of a pattern of constituent elements, arranged in correspondence with an arrangement of cells in a display region, as desired or required with a minimized quantity of the film material.

In order to accomplish this and other objects of the present invention, there is provided a method of manufacturing a flat display panel, which includes depositing on one surface of a substrate a film material of a kind, which eventually forms the constituent elements on the substrate, in a predetermined pattern sufficient to encompass the eventually formed pattern of constituent elements. The film so deposited is subsequently irradiated with a laser beam so that the pattern of the film material can be shaped to a shape coincident with the pattern of the eventually formed constituent elements.

According to the present invention, since the area of the substrate on which the film made of the film material used to form the constituent elements is formed is a localized surface area of the substrate, not the entire surface area of the substrate, the amount of the film material used can advantageously be reduced to a value smaller than that that would be required to deposit the film material on the entire surface area of the substrate. The smaller the area of the substrate occupied by the constituent elements, the more savable the amount of the film material.

Also, according to the present invention, since the pattern shaping is performed, deposition of the film material eventually forming the constituent elements need not be strictly controlled. As compared with the film material deposited on the entire surface of the substrate, the amount of the film material to be removed by laser irradiation is relatively small and, therefore, an undesirable thermal deformation of the film can advantageously be reduced with a minimized quantity of the laser beam used to irradiate the film.

For deposition of the film material on a localized surface area of the substrate, an ink jetting technique can be suitably employed in terms of the amount of the film material needed to form the film and the number of process steps. While the ink jetting technique involves a peculiar problem in that microscopic irregularities tend to occur in pattern edges depending on the size of ink droplets jetted, such a problem can be tolerated in the practice of the present invention since the pattern shaping is employed. Alternatively, an offset printing technique may be employed, in which after a surface portion of the substrate has been surface treated to have an ink repellent property, the entire surface of the substrate is printed with the film material. Even though the offset printing technique is employed, the film material will not deposit on the entire surface of the substrate and, therefore, the amount of the film material needed is quite small.

According to the present invention, the amount of the film material needed to form the pattern of the constituent elements in correspondence with the cell arrangement of the screen can advantageously be reduced.

Specifically, since the amount of the film material needed to form the constituent elements of the predetermined pattern can advantageously be minimized, the present invention can bring about a contribution to reduction in cost of the flat display panel. Also, the present invention can find an application not only in formation of the electrodes employed in the plasma display panel, but also in formation of a light shielding pattern and/or color filters on the front substrate used in the plasma display panel, formation of fluorescent coatings used in the plasma display panel and formation of color filters used in a liquid crystal display panel.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIGS. 4A and 4B illustrate the sequence of formation of transparent electroconductive films of display electrodes employed in the plasma display panel, wherein FIG. 4A is a schematic perspective view of a substrate being jetted with an inking material and FIG. 4B is a schematic perspective view of the substrate being irradiated with a laser beam.

DESCRIPTION OF THE PREFERRED EMBODIMENTS

In the description of the present invention that follows, reference will be made to minimization of a film material used to form electrodes during the manufacture of a plasma display panel (PDP), one of the FPDs which emits light by the effect of gas discharge.

Figure 1:
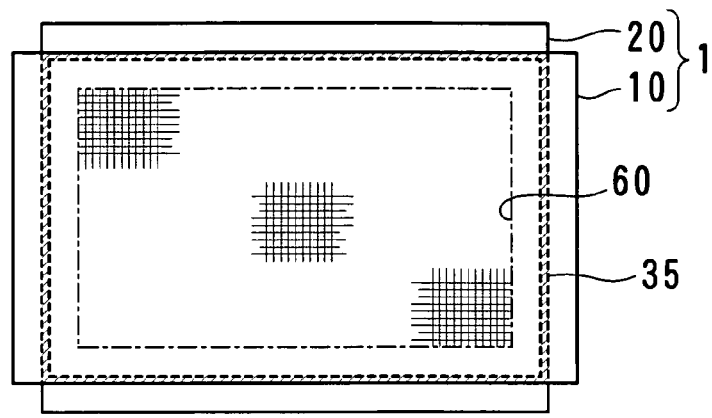
FIG. 1 is a schematic front elevational view of a plasma display panel according to a preferred embodiment of the present invention, showing the structure thereof.

Referring first to FIG. 1 showing, in a schematic representation, the structure of the plasma display panel according to the present invention, the plasma display panel 1 shown therein includes a front substrate structure 10, which is positioned forwardly of the rear substrate structure 20 with respect to the position of viewers, and a rear substrate structure 20 positioned rearwardly of the front substrate structure 10. Each of the front and rear substrate structures 10 and 20 is made up of a glass substrate 11 or 21 and at least one panel component both of a size larger than the screen size of the plasma display panel. The front and rear substrate structures 10 and 20 are disposed in face-to-face relation with each other having been placed one above the other and are jointed together with their four-sided peripheral edges sealed by a sealant 35. A sealed space defined between those substrate structures 10 and 20 is filled with a discharge gas of a kind well known to those skilled in the art.

So far shown in FIG. 1, the front substrate structure 10 has a width greater than that of the rear substrate structure 20, so that in an assembled condition in which those substrate structures 10 and 20 are jointed together in the manner described above, the front substrate structure 10 has its left and right portions protruding outwardly from the rear substrate structure 20. On the other hand, the rear substrate structure 20 has a height greater than that of the front substrate structure 10, so that in the assembled condition, the rear substrate structure 20 has its upper and lower portions protruding outwardly from the front substrate structure 10. As is well known to those skilled in the art, those portions of the respective substrate structures 10 and 20 that protrude outwardly as described are used to support thereon a flexible wiring plate (not shown) for electrical connection with an external drive circuit component. It is also well known to those skilled in the art that a surface area of the plasma display panel 1 where cells are arranged represents a screen 60.

Figure 2:
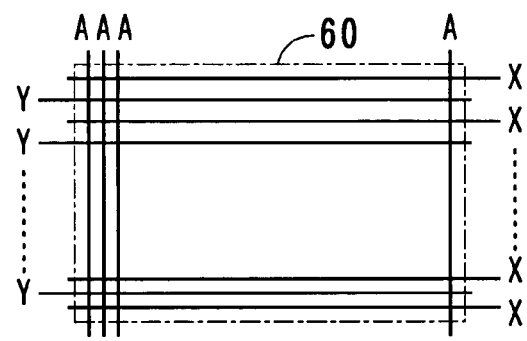
FIG. 2 is a schematic diagram showing a matrix of electrodes employed in the plasma display panel.

An array of electrodes arranged in a matrix is schematically shown in FIG. 2. The electrode matrix shown therein has a number of rows occupied by display electrodes X and display (or scanning) electrodes Y, which extend parallel to each other and alternating with each other, and a number of columns occupied by addressing (or data) electrodes A which extend parallel to each other and perpendicular to the alternating display electrodes X and Y. The neighboring display electrodes X and Y form an electrode pair, and the total number of the electrode pairs shown is equal to the number n of the rows of the electrode matrix. Of the total display electrodes X and Y, the number of which is (n+1), the display electrode X disposed at one of opposite side edges of the electrode matrix and the display electrode Y immediately neighboring such display electrode X are utilized to effect a display at the leading row of the electrode matrix, whereas the display electrode X disposed at the other of the opposite side edges of the electrode matrix and the display electrode Y immediately neighboring such display electrode X are utilized to effect a display at the trailing row of the electrode matrix. The remaining display electrodes X and Y are utilized to effect a display at the neighboring two rows (odd-numbered and even-numbered rows) of the electrode matrix.

Figure 3:
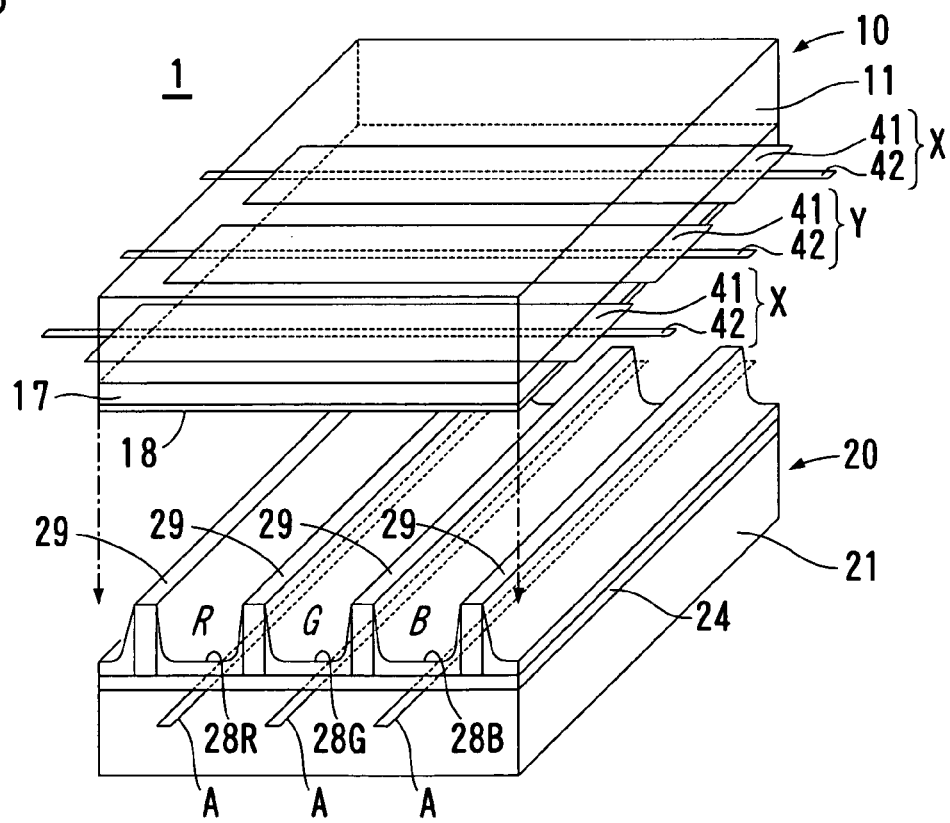
FIG. 3 is an exploded view of a portion of the plasma display panel, showing an array of cells employed therein.

The cell structure employed in the plasma display panel is shown in FIG. 3, in which for facilitating a better understanding the internal structure of the plasma display panel, only a portion of the plasma display panel 1 is shown in an exploded representation with the front and rear substrate structures 10 and 20 separated from each other.

The plasma display panel 1 shown in FIG. 3 is of an AC type having three-electrode surface discharge system. The front substrate structure 10 includes a glass substrate 11, an array of display electrodes X and Y referred to hereinabove, a dielectric layer 17 and a protective layer 18. Each of the display electrodes X and Y is made up of a transparent electroconductive film 41 for defining a surface discharge gap and a metal film 42 which is a bus conductor capable of reducing the electric resistance. The transparent electroconductive film 41 in the illustrated embodiment is in the form of a thin electroconductive stripe having a predetermined width.

On the other hand, the rear substrate structure 20, positioned rearwardly of the front substrate structure 10, includes a glass substrate 21, an array of addressing electrodes A referred to hereinabove, a dielectric layer 24, partition walls 29 and phosphor layers 28R, 28G and 28B. The partition walls 29 are in the form of a straight rib extending parallel to the respective addressing electrode A and protruding outwardly in a direction substantially perpendicular to the glass substrate 21 and is employed one for each gap between the neighboring addressing electrodes A. When the front and rear substrate structures 10 and 20 are sandwiched together, the partition walls 29 define gas discharge spaces one for each column of the display matrix.

The plasma display panel 1 of the structure described above operates in the following manner. As hereinbefore described, one of the display electrodes, for example, the display electrodes Y are utilized for selecting rows. When an addressing discharge takes place between the scanning electrode and the addressing electrode, addressing is carried out in which wall charge is developed on a surface of the dielectric layer 17 within each of the cells that is to be energized. After the addressing, trains of sustaining pulses of alternating polarities are applied successively to the display electrode pairs so that in response to application of each sustaining pulse, a display discharge in the form of a surface discharge can occur between the display electrodes within the cells to be excited. As a result of the display discharge, the discharge gases filled in the respective discharge spaces emit ultraviolet rays of light which subsequently impinge upon the corresponding phosphor layers 28R, 28G and 28B to excite the latter. It is to be noted that the characters R, G and B affixed to the reference numeral "28" stand for abbreviations of the respective colors, Red, Green and Blue, of light emitter from the phosphor layers when the latter are so excited.

Manufacture of the plasma display panel 1 of the structure discussed above may include a number of processes, i.e., a process of preparing the front and rear substrate structures 10 and 20 separately, a process of integrating the front and rear substrate structures 10 and 20 together with their peripheral edges sealed, and a process of cleaning the internal space and filling the internal space with discharge gases. During the preparation of the front substrate structure 10, transparent electroconductive films 41, which eventually form the display electrodes X and Y, are formed in the following manner and specifically as discussed in the following examples.

EXAMPLE 1

The transparent electroconductive films 41 are formed by the use of an ink jetting process in which an electroconductive inking material is jetted onto a support surface, i.e., the glass substrate 11. The electroconductive inking material is in the form of a liquid medium having microparticles of ITO (indium-tin oxide) or tin oxide ($SnO_2$) dispersed therein. Since the glass substrate 11 has no capability of absorbing and, hence, retaining deposits of the inking material on its surfaces as is well known to those skilled in the art, direct jetting of the inking material onto the glass substrate 11 would result in scattering of the jetted inking material to such an extent as to disturb formation of the desired pattern. To enable the pattern of the electrodes to be formed satisfactorily, a film is preformed on the surface of the glass substrate 11 to enhance the wettability of the glass substrate 11 onto which the inking material is to be jetted. Formation of this film required to enhance the wettability can be accomplished either by a dip method in which the glass substrate 11 is immersed in a liquid bath or by depositing a film forming material on the glass substrate 1 under a predetermined atmosphere.

Figure 4A:
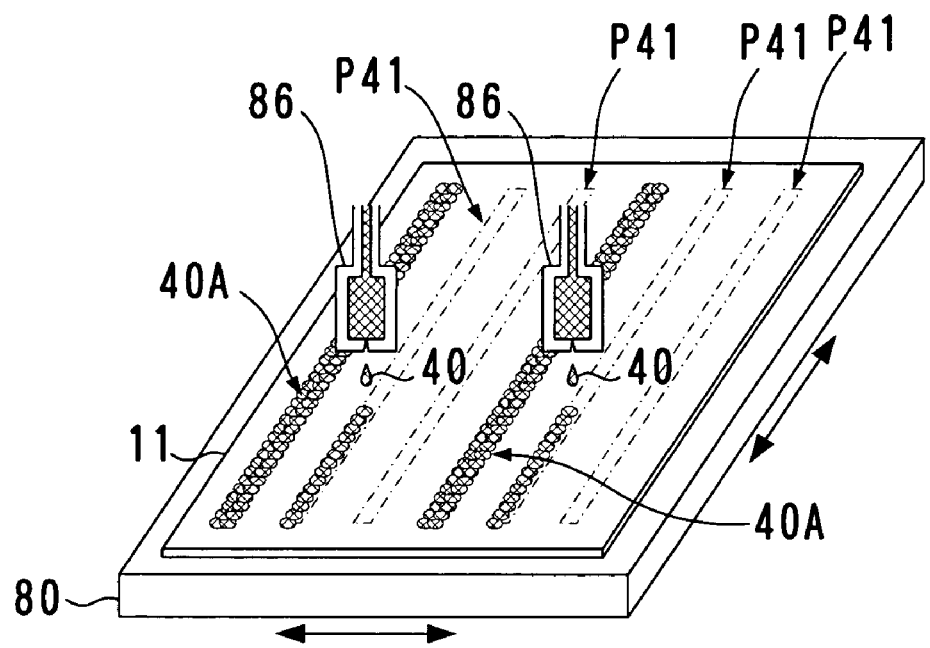
Figure 4B:
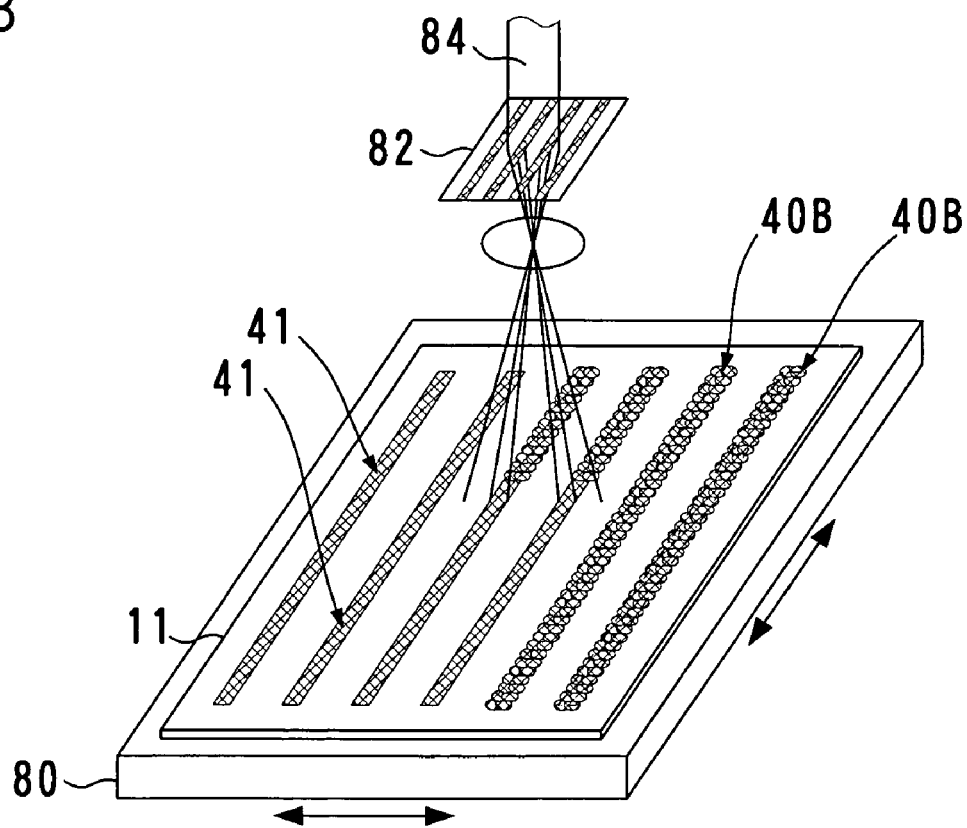

Referring now to FIGS. 4A and 4B, there is shown the sequence of formation of the transparent electroconductive films that eventually define the display electrodes. As shown in FIG. 4A, the glass substrate 11 is placed on an X-Y table 80 capable of undergoing translational motion in two directions perpendicular to each other and having one or more jetting nozzles 86, with the jetting nozzles 86 held in face-to-face relation with the glass substrate 11. To form ink deposits or films 40A of the electroconductive inking material each in a predetermined pattern sufficient to encompass the corresponding pattern P41 of the transparent electroconductive film 41, the jetting nozzles 86 and the glass substrate 11 are moved relative to each other while the electroconductive inking material 40 is jetted onto the glass substrate 11. It is to be noted that the use of the ink jetting device having a plurality of jetting nozzles 86 such as shown is effective to maximize the productivity.

The surface area of the glass substrate 11, on which the patterns of the ink deposits 40A are deposited, is so chosen as to be larger than the area occupied by the patterns P41 of the transparent electroconductive films so that each pattern of the ink deposit 40A may be of a size sufficient to cover the corresponding pattern P41 of the transparent electroconductive film with a side drop of a few micrometers protruding laterally outwardly therefrom over the entire perimeter thereof. Preferably, the side drop referred to above is as small as possible, provided that the pattern of the ink deposit 40A can cover the corresponding pattern P41 in its entirety.

Subsequently, baking is carried out to extinct organic components contained in the ink deposits 40A, followed by a pattern shaping of the baked ink deposits 40B. To this end, using the X-Y table 80, unnecessary portions of the baked ink deposits 40B are removed by irradiation with the incoming laser beam 84 while the incoming laser beam 84 and the glass substrate 11 are moved relative to each other, as shown in FIG. 4B.

It is to be noted that for the laser irradiation, any of YAG laser beam, excimer laser beam and $CO_2$ laser beam can be suitably employed in the practice of the present invention, provided that such laser beam is capable of emitting energies necessary to sublime the inking material used. In the illustrated embodiment, a light shielding mask 82 patterned to correspond to the patterns P41 of the transparent electroconductive films is employed during the laser irradiation.

More specifically, since in the illustrated embodiment the patterns P41 are of a rectilinear shape, the X-Y table 80 is translated parallel while the glass substrate 11 is continuously irradiated with the laser beam 84, to thereby accomplish the intended patterning. Where the patterns P41 are not of a rectilinear shape, for example, in the case of complicated patterns each having a generally T-shaped portion for each of cells of the screen, the laser irradiation should be carried out by a step exposure system while a light shielding mask that is properly chosen for the complicated patterns is employed. Alternatively, the laser irradiation may be carried out on a delineating scheme in which no light shielding mask is employed. It is to be noted that in place of the glass substrate 21 being moved, the laser beam may be moved, e.g., scanned.

EXAMPLE 2

In place of the formation of the ink deposits 40A by the utilization of the ink jetting technique as in the foregoing Example 1, an offset printing technique may be employed to deposit the inking material 40 on the glass substrate 11. In such case, a surface treating material effective to enhance the ink repellent property or the wettability of a portion of the substrate surface is printed by the use of a screen printing process so that the inking material 40 can be deposited only on that portion of the substrate surface. Subsequently, using a full surface coating device such as, for example, a die coater, the inking material 40 is printed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of manufacturing an electrode pattern of a flat panel display, comprising:

preparing a substrate employed to support the electrode pattern of the panel display;

printing a pattern of electroconductive ink deposits, parallel to one another, on the substrate using an ink jetting technique, the pattern encompassing an electrode pattern to be formed; and irradiating the substrate with a laser beam selectively to remove excess ink deposits, comprising portions other than portions corresponding to the electrode pattern to be formed.

2. The method according to claim 1, wherein the substrate is a front glass substrate for a plasma display panel, the method further comprising:

placing the front glass substrate on an X-Y table having plural nozzles spaced out on an upper side of the X-Y table, the nozzles being held in face-to-face relationship with the glass substrate; and printing the electrode pattern of the plural electroconductive ink deposits including a microparticle of an indium-tin oxide or a tin oxide so as to make a transparent electrode simultaneously by relatively moving the nozzles and the X-Y table, the number of electroconductive ink deposits corresponding to the number of nozzles.

* * * * *